United States Patent [19]

Anderson et al.

[11] 4,066,632

[45] Jan. 3, 1978

[54] CONTINUOUS REACTION FOR PREPARATION OF ARYLENE SULFIDE POLYMER

[75] Inventors: Kenneth L. Anderson, Bartlesville, Okla.; Donald G. Kuper, Borger, Tex.

[73] Assignee: Phillips Petroleum Company, Bartlesville, Okla.

[21] Appl. No.: 671,776

[22] Filed: Mar. 30, 1976

[51] Int. Cl.$^2$ .............................................. C08G 75/16
[52] U.S. Cl. ..................................... 260/79.1; 260/79
[58] Field of Search ................................. 260/79, 79.1

[56] References Cited

U.S. PATENT DOCUMENTS

| | | | |
|---|---|---|---|
| 3,756,993 | 9/1973 | Green et al. | 260/79.1 |
| 3,956,060 | 4/1976 | Scoggin | 260/79 |

Primary Examiner—Melvin P. Marquis

[57] ABSTRACT

Continuous production of arylene sulfide polymer is provided in a series of two or more reactors. A compound serving as a sulfur source is contacted in an organic amide with a dihalo aromatic compound and, optionally, at least one polymerization modifying compound to produce arylene sulfide polymer. The reaction mixture boils in each of a series of reaction zones to partially concentrate the mixture by removal of water and diluent and to remove polymerization heat. The degree of removal of water and organic amide is regulated to control the pressure in each boiling reactor so that polymer slurry is induced to flow to each subsequent reaction zone without pumping. Preferably an ascending reactor temperature profile is employed.

7 Claims, 1 Drawing Figure

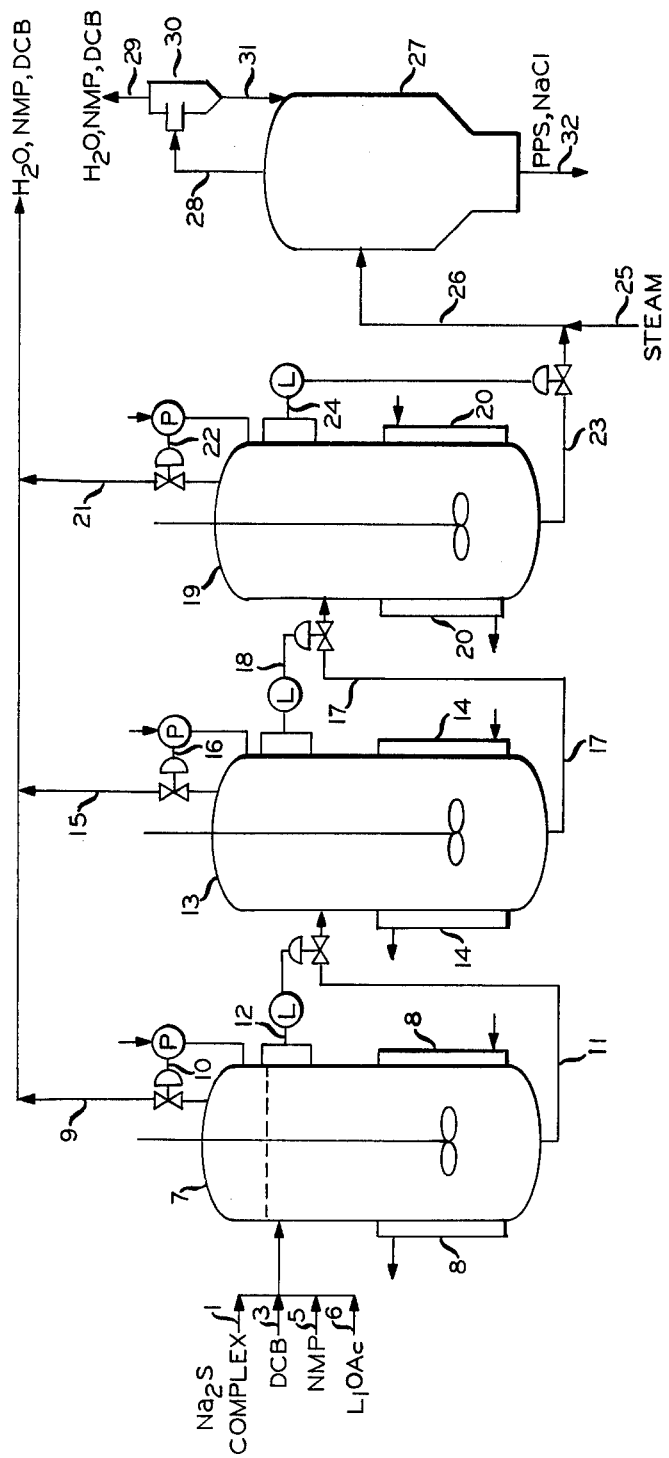

CONTINUOUS REACTION FOR PREPARATION OF ARYLENE SULFIDE POLYMER

BACKGROUND OF THE INVENTION

This invention is related to the production of arylene sulfide polymer. More particularly this invention is related to the production of phenylene sulfide polymer. In one of its aspects this invention is related to the continuous production of arylene sulfide polymer. In another of its aspects this invention is related to the use of multiple reaction zones in series in the production of arylene sulfide polymer.

In one concept of this invention, it relates to the continuous production of arylene sulfide polymer using multiple reaction zones in series with a seriatim reduction of pressure in the reaction zones to eliminate mechanical means for moving reaction mixture to each subsequent reaction zone.

Processes for producing arylene sulfide polymers are well known as shown in U.S. Pats. Nos. 3,354,129 and 3,919,177. Processes for the production of arylene sulfide polymer or more specifically, phenylene sulfide polymer, have heretofore been generally limited to batch operation. Up to now, a satisfactory method for the continuous operation of a process for producing arylene sulfide polymer has not been developed. An operative and economical method for the continuous production of arylene sulfide polymers would be advantageous. In this multi-reaction zone process, the undesirable use of pumping devices between the reaction zones can be eliminated by operating the reaction zones in series at seriatim decreasing pressures.

It is therefore an object of this invention to provide a method for continuous production of arylene sulfide polymer. It is another object of this invention to provide a multiple reaction zone process for the production of arylene sulfide polymer. It is still another object of this invention to provide a multiple reaction zone process for the production of arylene sulfide polymer in which the pressure of each of the reaction zones is regulated to provide flow from one reaction zone to the next without the use of mechanical means of transfer between the reaction zones.

Other aspects, concepts, objects and the various advantages of this invention will be apparent from a study of this disclosure, the drawing and the appended claims.

STATEMENT OF THE INVENTION

According to the present invention there is provided a continuous process for producing arylene sulfide polymer using a plurality of reaction vessels connected in series in which the reaction feed compounds—a compound or complex serving a source of sulfur, a dihalo aromatic compound, an organic amide, and, optionally, a polymerization modifying compound—are introduced into a first reaction zone maintained at polymerization conditions in which the temperature and pressure are regulated partially to remove water from the reaction mixture by evaporation. The reaction mixture produced is retained in the first reaction zone for a time sufficient for the reactants to at least partially polymerize producing a arylene sulfide polymer slurry. The reaction mixture is then passed to second reaction zone in which the pressure is controlled at a level below that in the first reaction zone by regulation of evaporation of water and some diluent and the temperature level is maintained equal to or greater than that of the first reaction zone. The reaction conditions in the second reactor induce flow of reaction mixture from the first reaction zone to the second reaction zone and the concentration of solids in the reaction mixture is increased in the second reaction zone both by continued polymerization and by evaporation of liquids from the reaction mixture.

In one embodiment of the invention, polymerization is carried to substantial completion in two reaction zones so that reaction effluent from the second reaction zone can be subjected to substantially reduced pressure, thereby flash-evaporating the liquid portion of the reaction mixture to recover a particulate polymeric product and condensible vapor. The particulate polymeric product can then be subjected to further purification by known means of successive washings with water and/or steam and subsequent drying. The condensible vapor from the flash evaporation can be combined with vapors from the reaction zones for recovery of unreacted dihalo aromatic compound and organic amide from the water liberated in the reaction.

In another embodiment of the invention, the reaction process is carried into a third reaction zone which, like the second reaction zone, is maintained at a lower pressure and a higher temperature than the previous reaction zone. When the third reaction zone is used, the polymerization is substantially completed in the third reaction zone and the effluent reaction mixture from the third reaction zone is subjected to a substantially reduced pressure to flash-evaporate remaining reaction liquids from the particulate polymeric product and byproduct.

The method of this invention for continuously producing arylene sulfide polymer using a plurality of reaction vessels connected in series is suitable for use with any reaction process producing arylene sulfide polymer in which a compound suitable as a sulfur source is contacted with a dihalo aromatic compound in the presence of an organic amide and, optionally, in the presence of a modifier such as an alkali metal carboxylate. The preferred processes for producing arylene sulfide polymers by the continuous polymerization method of this invention are those polymerization systems set out in U.S. Pat. Nos. 3,354,129 and 3,919,177. In these patents, incorporated herein by reference, are set out polymerization conditions and reactants particularly suitable for use in the present invention.

In general, by the process of this invention a compound or compounds suitable as a sulfur source is contacted with an organic amide under conditions of temperature and pressure sufficient to form a water-containing complex of the sulfur source and the organic amide. A metered flow rate of this complex along with a metered flow rate of dihalo aromatic compound and additional organic amide used as a reaction diluent are fed into the first reaction vessel.

The reaction conditions useful in the process of this invention can vary widely depending upon the reactants being used and the type of polymer sought to be formed in the reaction. It has been found that, in general, a reaction temperature in the range of about 125° C to about 450° C and a pressure of about 1 Kg/cm$^2$ to about 20 Kg/cm$^2$ in the first reaction vessel will initiate a polymerization reaction and will vaporize both water and some organic amide diluent to concentrate the polymerization mixture. It is preferred that the reaction temperature be maintained within the range of about 175° C to about 350° C and that the reaction pressure be maintained within the range of about 5 kg/cm² to about 18 Kg/cm².

Subsequent reaction vessels in the seriatim chain are maintained at successively lower pressures of about 2 Kg/cm² less than the immediately preceding reactor. This facilitates flow of effluent from one reaction zone to the next without the aid of a mechanical pumping device. It is also advantageous to maintain the temperature in the subsequent reaction vessels in the seriatim chain in the range of about 5° C to about 20° C higher than the last previous reaction vessel. This increase in temperature is an aid in approaching complete conversion of the reactants and in removing water and some organic amide diluent further to concentrate the polymerization mixture in the successive reaction zones.

Contact time in the reaction chambers is controlled to be sufficient for the desired degree of completion of polymerization to be carried out. In general, the total contact time in the reactor system will range from about 1 to about 8 hours. Each of the reaction vessels is provided with agitating means to insure adequate contact between the reactants.

The relative amounts of reactants employed in the method of this invention will vary according to the product that is sought to be formed; however, the ratios of reactants will fall within the amounts set forth in U.S. Pat. Nos. 3,354,129 and 3,919,177.

The invention can best be understood in conjunction with the drawing which is a schematic representation of a continuous reaction system containing three separate reaction zones and a vessel for the flash vaporization of liquids from the reaction mixture to produce a particulate polymeric product. The drawing will be described in conjunction with a particular embodiment of the invention in which specific reactants are used. This example should be taken as illustrative and not as restrictive to the scope of the invention.

Referring now to the drawing, a water-containing chemical complex of N-methyl-2-pyrrolidone and sodium sulfide which serves as a sulfur source is prepared by heating a mixture comprising N-methyl-2-pyrrolidone and sodium sulfide in a weight ratio of about 2/1 at about 200° C. This complex is fed at metered flow rate through line 1 along with a metered flow of 1,4-dichlorobenzene through line 3 and a metered flow of additional N-methyl-2-pyrrolidone used as a polar diluent through line 5 into first reactor vessel 7. A metered flow of polymer modifier such as lithium acetate may also be fed through line 6, preferably as a solution in a warmed portion of the NMP. The dichlorobenzene is supplied on the basis of about 1 mole per mole of sodium sulfide. The NMP diluent is supplied on the basis of approximately a 2 to 1 weight ratio to dichlorobenzene. The reaction conditions is agitated reactor 7 are a temperature of approximately 260° C maintained by hot oil cooling jacket 8 and a pressure of approximately 15 Kg/cm². At these conditions, phenylene sulfide polymer is formed and liberated water and some dichlorobenzene and/or N-methyl-2-pyrrolidone are vaporized and removed through overhead line 9 as regulated by back pressure control system 10 thereby partially concentrating the polymerization mixture.

The polymerization mixture is removed through line 11 to agitated reactor 13 in response to regulation by liquid level control system 12. Reactor 13 is maintained at a temperature of approximately 274° C by hot oil cooling jacket 14 and at a pressure of about 13 Kg/cm2 by back pressure control system 16. The pressure difference between vessels 7 and 13 induces polymer slurry flow through line 11 from reactor 7. The reduced pressure along with the increased temperature in reactor 13 causes further vaporization of water and some N-methyl-2-pyrrolidone with the vapors carried overhead through line 15. The further concentrated polymerization mixture is removed through line 17 into agitated reactor 19 in response to regulation by liquid level control system 18. Reactor 19 is maintained at conditions of approximately 288° C by hot oil cooling-heating jacket 20 and a pressure of about 11 Kg/cm² by back pressure control system 22 at which conditions most of the remaining water and additional N-methyl-2-pyrrolidone is vaporized and removed through overhead line 21 to produce a highly concentrated polymerization slurry. This slurry is removed from reactor 19 through line 23, in response to regulation by liquid level control system 24. On passing through the level control valve the pressure is reduced to approximately atmospheric. The effluent containing particulate solids, salts, some water, and NMP diluent is then mixed with superheated steam from line 25 and discharged at about atmospheric pressure by line 26 into flash tank 27 where most of the remaining liquid is vaporized with the vapors being removed through line 28. The solid products are discharged through line 32 for further processing to remove salt contaminants. Cyclone 30 may optionally be employed to recover fine particles from vapor stream 28, returning these particles to flash tank 27 by line 31 and yielding vapor stream 29. The vapor streams 9, 15, 21, and 29 can be combined for recovery of N-methyl-2-pyrrolidone and unreacted dichlorobenzene and separating the water therefrom.

The continuous process set forth in this example produces a light gray, solid particulate product suitable for use as coatings, fibers, films, and molded objects.

Similarly, a phenylene sulfide polymer product modified in physical properties such as molecular weight can be produced by including as a reactant in the first reaction zone an alkali metal carboxylate such as lithium acetate fed in metered flow rate through line 6. By including lithium acetate at a mol ratio of 0.5 mol lithium acetate to 1.0 mol dichlorobenzene in the reaction feed to reactor 7 in the process discussed above, a modified phenylene sulfide polymer particulate solid is produced continuously with continuous recovery of unreacted feed components, water and diluent.

In addition to providing sufficient pressure decline through the reactor train, in spite of an ascending temperature gradient, so that mechanical pumping of reaction mixture to downstream reactors is not required, the boiling action within the reactors will tend to improve mixing, polymer concentration will be increased by removal of volatilized water and NMP diluent and heat generated by exothermic polymerization reaction will be removed, reducing reactor jacket and/or internal coil heat removal requirements. Depending upon the degree of completion of the reaction within the first reactor, a third reactor might not be used or, if used, its function might be described as high temperature soaking and/or polymer concentration. Also, if reaction heat generation were minimal, supplementary heating via hot oil circulated through jacket 20 might be required to achieve desired temperature level and degree of concentration.

The following is a simplified example of the operation of this process employing a preformed complex of sodium sulfide, water and N-methyl-2-pyrrolidone (NMP)

as the sulfur source, p-dichlorobenzene (DCB) as the dihalo aromatic compound, lithium acetate (LiOAc) as the polymer modifier and NMP as the reaction diluent to produce phenylene sulfide polymer (PPS). All flows are stated in terms of kilograms per hour and are referred to the stream numbers in the drawing and the description of the drawing.

| Component | Stream Number | | | | | | | | | | |
|---|---|---|---|---|---|---|---|---|---|---|---|
| | 1 | 3 | 5 | 6* | 9 | 15 | 21 | 23 | 25** | 29 | 32 |
| Na$_2$S | 935 | | | | | | | | | | |
| NaOH | 2 | | | | | | | 2 | | | 2 |
| H$_2$O | 745 | | | | 485 | 147 | 113 | | 500 | 500 | |
| NMP | 1189 | | 2430 | | | 5 | 20 | 3594 | | 3594 | |
| DCB | | 1784 | | | 5 | | | 18 | | 18 | |
| LiOAc | | | | 801 | | | | 801 | | | 801 |
| NaCl | | | | | | | | 1400 | | | 1400 |
| PPS | | | | | | | | 1295 | | | 1295 |
| TOTAL | 2871 | 1784 | 2430 | 801 | 490 | 152 | 133 | 7110 | 500 | 4112 | 3498 |

*LiOAc in MNP
**Superheated steam.

As can be seen from the calculated example above, the continuous process for preparing arylene sulfide polymer set forth in this specification provides an effective and economical method for polymerization efficiently using a minimum investment in operating equipment.

We claim:

1. A continuous process using a plurality of reaction vessels connected in series for producing arylene sulfide polymer by contacting a dihalo aromatic compound with a sulfur source in an organic amide to produce a particulate polymeric product, said method comprising:
   a. introducing the reactant compounds into a first reaction vessel maintained at polymerization conditions of temperature and pressure sufficient to remove water and organic amide from the reaction by evaporation thereby producing a reaction mixture;
   b. introducing effluent reaction mixture from the first reaction vessel to a second reaction vessel maintained at a pressure about 2 Kg/cm$^2$ below the pressure of the first reactor that flow of reactants is induced from said first reaction vessel to said second reaction vessel, said second reaction vessel maintained at a temperature sufficient to evaporate water and organic amide from the reaction mixture thereby concentrating the reaction mixture in the second reaction vessel; and
   c. subjecting the effluent reaction mixture from the second reaction vessel to a reduced pressure sufficient to flash evaporate the liquid portion to recover a particulate, polymeric product and a condensible vapor.

2. The method of claim 1 wherein effluent from the second reaction vessel is introduced into a third reaction vessel in which the pressure is reduced about 2 Kg/cm$^2$ below that of the second reaction vessel to induce flow of effluent from the second reaction vessel to the third reaction vessel and subjecting the effluent from the third reaction vessel to flash evaporation to recover a particulate, polymeric product and a vaporized liquid.

3. The method of claim 1 wherein the temperature of the second reaction vessel is increased about 5° C to about 20° C above that of the first reaction vessel.

4. The method of claim 2 wherein the temperature in the second reaction vessel is increased about 5° C to about 20° C above that of the first reaction vessel and the temperature of the third reaction vessel is increased about 5° C to about 20° C above that of the second reaction vessel.

5. A method of claim 1 wherein the reactant compounds comprise a polymerization modifying compound.

6. A method of claim 1 wherein the polymerization conditions comprise reaction temperature within the range of about 125° C to about 450° C and reaction pressure in the range of about 1 Kg/cm$^2$ to about 20 Kg/cm$^2$.

7. A method of claim 6 wherein the reaction temperature is about 175° C to about 350° C and the reaction pressure is about 5 Kg/cm$^2$ to about 18 Kg/cm$^2$.

* * * * *